Patented Nov. 26, 1940

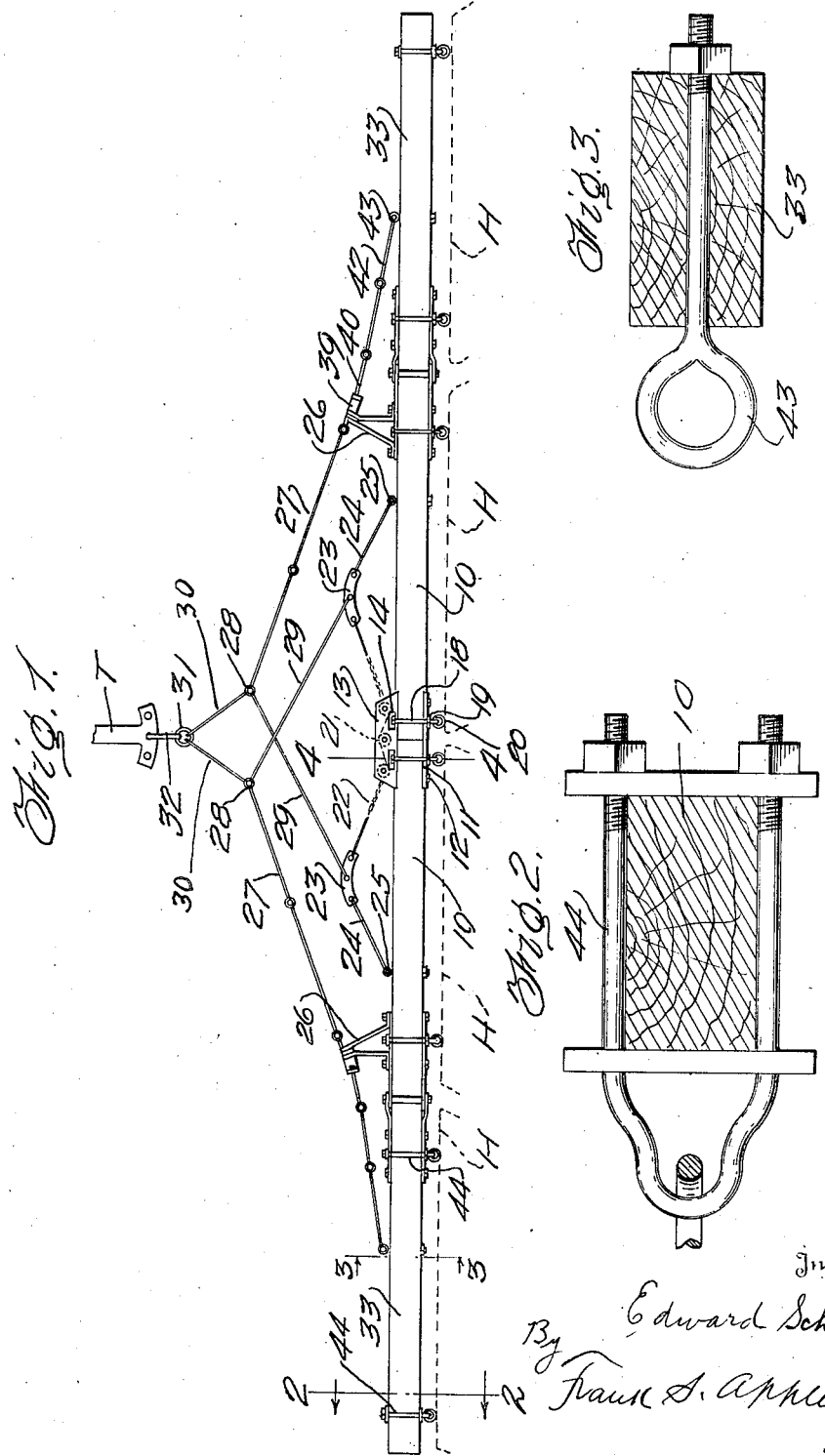

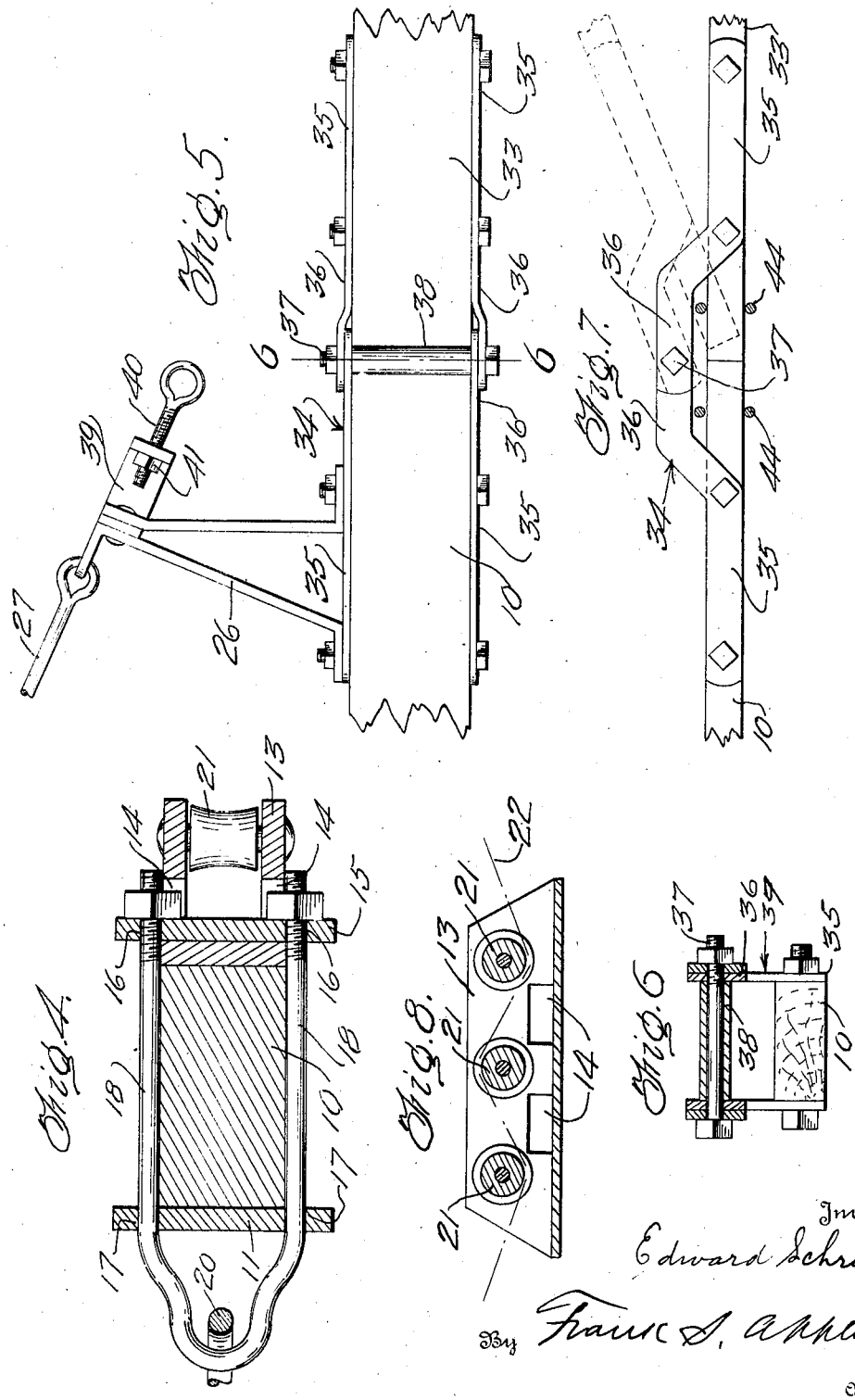

2,223,134

UNITED STATES PATENT OFFICE 2,223,134

DRAFT EQUALIZER

Edward Schruth, Pepin, Wis., assignor to Northern Wisconsin Manufacturing Co., Pepin, Wis., a corporation of Wisconsin Application June 15, 1939, Serial No. 279,349

2 Claims. (Cl. 55—84)

This invention relates to draft equalizers and particularly in relation to the draft equalizers used in connection with a series of laterally disposed harrow frames, a device of this kind being commonly known as a "harrow hitch."

More particularly, the invention relates to improvements in the patent issued to A. E. Schruth et al. on October 25, 1927, No. 1,646,768.

One important object of this invention is to provide a novel arrangement of hitch embodying a draw bar having three sections flexibly connected.

A second important object of the invention is to so construct the hitch that relatively short pieces of lumber may be used in the construction of such draw bar.

A third important object of the invention is to provide a hitch for connecting harrows to a tractor in such manner that the tractor may turn on a short radius without interference between the rear tractor wheels and the hitch members.

A fourth important object of the invention is to provide means for adjusting the stresses on the draw bar sections so that the latter may be kept in longitudinal alinement thus avoiding improper stresses on the joints connecting said sections.

A fifth important object of the invention is to provide a light construction of equalizer which will avoid pulling the front parts of the attached harrows downwardly.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a plan view of the complete hitch;

Figure 2 illustrates an enlarged detail section on the line 2—2 of Fig. 1;

Figure 3 illustrates a similar section on the line 3—3 of Fig. 1;

Figure 4 illustrates a similar section on the line 4—4 of Fig. 1;

Figure 5 illustrates an enlarged plan view of one of the draw bar joints with certain parts omitted;

Figure 6 illustrates a section on the line 6—6 of Fig. 5;

Figure 7 illustrates a side elevation of one of the hinge joints in somewhat different proportions than Fig. 5; and Figure 8 illustrates a longitudinal section of a certain roller bracket shown in Fig. 1.

In the form of the invention shown herein, there is provided a pair of rigidly alined draw bar center members 10 forming a middle draw bar section. The purpose of making this middle draw bar section in two parts is to enable short draw bar sections to be used, thereby providing economy of construction. At the rear face of the abutting ends of the members 10 is a fish plate 11, bolted to the members 10 as at 12. In front of the joint between the members 10 is a channel bracket 13, the purpose of which will presently be described. The flanges of this bracket are provided with opposed openings 14 wherethrough pass straps 15 (Fig. 4) having holes 16 adjacent its ends. The fish plate 11 has openings 17 alined with the openings 16 and through these openings pass the arms 18 of a pair of alined yokes 19 carrying rings 20 at their rear ends for attachment of harrow sections, such sections being indicated at H in Fig. 1.

Carried by the member 13 is a set of three idler rolls 21 around which is trained the central part of a flexible strand 22 such as a chain or the like, the center line only of the strand being shown in Fig. 8. The outer ends of this strand are connected to the inner ends of equalizing levers 23 which have their outer ends connected by links 24 to eye bolts 25 fixed in the outer parts of the members 10.

Adjacent the outer end of each member 10 and firmly secured thereto is a bracket 26 whereto is flexibly secured the outer end of a flexible tension member 27 having its inner end secured to a ring or eye 28 from which a link 29 extends to the middle of the equalizer on the opposite side of the device.

The rings 28 are connected by links 30 to a central rink 31 carrying a clevis 32 for connection to a tractor part as at T.

Hinged for vertical swinging movement to the outer ends of the members 10 are outer draw bar members 33. The hinges connecting these members 33 with each member 10 consist of pairs of hinge members 34, one pair in front of and the other pair behind the joint between each member 33 and the corresponding member 10. Each hinge member consists of outer parts 35 and inner overlapping parts 36 offset upwardly above the members 10 and 33 so as to leave space for certain yokes hereinafter described. This is shown in Figs. 5 and 7. Connecting the overlapping portions of each pair of hinges is a pintle 37 and the front and rear hinges are spaced by a sleeve 38 fitting on said pintle.

The brackets 26 each carries an auxiliary bracket 39 wherethrough extends an eye bolt 40 adjustable by a nut 41 and having connected thereto a tension member 42 having its outer end connected to an eye bolt 43 carried by the member 33 well outwardly from the hinge.

Yokes 44 similar to the yokes 18 extend around the members 10 and 33 and may be positioned along said members wherever desired to form connections for the harrow sections H.

In operation, whenever the member T moves to one side in turning, as to the left, the pull on the right members 27 and 42 increases, as does also the pull of the right member 29 on the equalizer 23 which produces a sliding of the strand 22 over the rollers and thus decreases the pull on the left side so as to cause the left side to lag and the right side to move more rapidly in a forward direction. Thus the whole device keeps at all times nearly parallel to the rear of the tractor.

Also, it will be noted that either end section may be swung up to clear brush, stumps and the like, and that the adjustment of the bolt 40 serves to keep the members 10 and 33 in alinement so that no undue stress is brought on the hinges.

I claim:

1. In a draft device for harrows and the like, a transversely extending draw bar, forwardly extending brackets each attached to the draw bar between the center and a respective end of the bar, tension elements each having one end attached to the forward end of a bracket and its other end attached to the draw bar between the bracket and the adjacent end of the bar, a clevis positioned forwardly of the center of the draw bar, a pair of rearwardly extending diverging links connected swingingly at their forward ends to said clevis, tension members connecting the rear ends of said links flexibly with the forward ends of the brackets on the sides toward which the links diverge, a roller mechanism fixed to the draw bar at the center thereof, a flexible element trained through said roller mechanism and having its ends extending divergingly forward therefrom, rigid equalizing levers each having one end pivoted to an end of said flexible element, tension elements each connecting the remaining end of a rigid equalizing lever to the draw bar adjacent a respective bracket, and links each connecting the center of a rigid equalizing lever to the rear end of a respective clevis connected link on the opposite side of the line connecting the clevis and the center of the draw bar.

2. In a draft device for harrows and the like, a transversely extending draw bar, forwardly extending brackets each attached to the draw bar between the center and a respective end of the bar, tension elements each having one end attached to the forward end of a bracket and its other end attached to the draw bar between the bracket and the adjacent end of the bar, a clevis positioned forwardly of the center of the draw bar, a pair of rearwardly extending diverging links connected swingingly at their forward ends to said clevis, tension members connecting the rear ends of said links flexibly with the forward ends of the brackets on the sides toward which the links diverge, a roller mechanism fixed to the draw bar at the center thereof, a flexible element trained through said roller mechanism and having its ends extending divergingly forward therefrom, said roller mechanism including at least three rollers whereby the flexible element is caused to assume a sinuous path by passing alternately behind and in front of said rollers, rigid equalizing levers each having one end pivoted to an end of said flexible element, tension elements each connecting the remaining end of a rigid equalizing lever to the draw bar adjacent a respective bracket, and links each connecting the center of a rigid equalizing lever to the rear end of a respective clevis connected link on the opposite side of the line connecting the clevis and the center of the draw bar.

EDWARD SCHRUTH.